US008576282B2

(12) United States Patent
Salgar et al.

(10) Patent No.: US 8,576,282 B2
(45) Date of Patent: Nov. 5, 2013

(54) SECURITY SYSTEM WITH OPERATOR-SIDE PRIVACY ZONES

(75) Inventors: Mayur S. Salgar, Karnataka (IN); Deepakumar Subbian, Karnataka (IN); Marine Drive, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 1117 days.

(21) Appl. No.: 12/333,721

(22) Filed: Dec. 12, 2008

(65) Prior Publication Data

US 2010/0149330 A1 Jun. 17, 2010

(51) Int. Cl.
*H04N 7/18* (2006.01)

(52) U.S. Cl.
USPC ............................ 348/143; 348/169; 382/103

(58) Field of Classification Search
USPC ................... 348/143, 169, 149, 152; 382/103
See application file for complete search history.

(56) References Cited

U.S. PATENT DOCUMENTS

| | | | | |
|---|---|---|---|---|
| 2006/0203098 | A1* | 9/2006 | Henninger et al. | 348/211.99 |
| 2007/0115356 | A1* | 5/2007 | Kang et al. | 348/143 |
| 2008/0055409 | A1* | 3/2008 | Mars et al. | 348/143 |
| 2010/0111444 | A1* | 5/2010 | Coffman | 382/285 |
| 2010/0125581 | A1* | 5/2010 | Peleg et al. | 707/737 |

* cited by examiner

*Primary Examiner* — Philip B Tran
(74) *Attorney, Agent, or Firm* — Husch Blackwell

(57) ABSTRACT

A system and method for operator-side privacy zone masking of surveillance is provided. The system includes a video surveillance camera equipped with a coordinate engine for determining coordinates of a current field of view of the surveillance camera; and a frame encoder for embedding the determined coordinates with video frames of the current field of view. The system also includes a privacy zone information database for storing coordinates of predefined privacy zones; and a video viewing unit for viewing stored video frames. The video viewing unit is in communication with the frame storage unit and the privacy zone information database.

12 Claims, 2 Drawing Sheets

SECURITY SYSTEM WITH OPERATOR-SIDE PRIVACY ZONES

FIELD OF THE INVENTION

The present invention relates generally to camera-based security systems, and more specifically, the present invention relates to a system and method for providing operator-side privacy zones in a camera-based security system.

BACKGROUND OF THE DISCLOSURE

Cameras are utilized in the security industry for monitoring large areas, both indoor and outdoor. However, when monitoring an area for security, there may be certain parts within the camera's field of view that need to be kept private. A window or doorway to a house, for example. If these are not blocked out, security personnel could snoop on members of the public and infringe personal privacy.

Conventional security systems employ in-camera privacy masking solutions. Privacy masking involves placing an obscuring visual element, such as an opaque rectangle, over areas designated as privacy zones during video capture. The masking process is performed at the camera by software that tracks the field of view of the camera as it pans, tilts and zooms. When the field of view of the camera includes a predefined privacy zone, the software masks the portion of the field of view in which the privacy zone is located prior to transmitting the video feed to the security monitoring station.

However, one drawback to the conventional implementation of privacy zones is that the video feed is permanently altered such that the mask cannot be removed. Consequently, once a mask is placed on an area of the video feed, unmasking is not possible regardless of whether permission is granted to view the particular privacy zone.

Additionally, since a defined privacy zone is essentially a three-dimensional section originating at the camera and terminating at the area to be masked, the privacy zone encompasses all the space lying between the camera and the private area. Consequently, public spaces lying in front of the private area may be masked as well.

For example, a camera has a predefined field of view defined as a volume in which objects contained therein can be captured by the camera and displayed to an observer (not shown). When a region is masked, in actuality a volume containing the masked region is obscured as well. This masking of the volume containing the masked region is due to the fact that the image captured by the camera is a two-dimensional representation of a three-dimensional field of view. Consequently, the camera is not able to place masks in such a way that objects directly in front of a masked region remain visible.

Most of the time, loss of this portion of the field of view does not cause any concern. However, in certain situations an intruder or criminal may make use of known privacy zones to obscure suspicious or criminal activities. With conventional camera-based masking of privacy zones, there is little that can be done to reveal activities that may be occurring within the public area included within the volume of the masked region. An operator is left only with the option of finding an observation angle that includes the public area in question while excluding the privacy zone so that the public area of interest is not obscured. The shortcoming in this method is that not all viewing angles will provide adequate detail of the activities that may be occurring in the public area of interest. For example, faces of the people may not be visible from other angles making identification of the suspects difficult, if not impossible.

Consequently, a need exists for providing a better balance between protecting privacy and providing surveillance of public spaces.

SUMMARY OF THE DISCLOSURE

An embodiment of the present invention includes a frame storage unit for receiving and storing video frames and at least one surveillance camera in communication with the frame storage unit. Each surveillance camera of the at least one surveillance camera has a coordinate engine for determining coordinates of a current field of view of the surveillance camera; and a frame encoder for embedding the determined coordinates with video frames of the current field of view.

Additionally, the present embodiment includes a privacy zone information database for storing coordinates of predefined privacy zones; and a video viewing unit for viewing stored video frames. The video viewing unit is in communication with the frame storage unit and the privacy zone information database.

The video viewing unit further includes a mask generator for receiving the stored coordinates of the predefined privacy zones and generating a mask for the predefined privacy zones located within a field of view of a currently requested video frame of the stored video frames; a render engine for combining the generated masks with the currently requested video frame to obscure regions of the video frame corresponding to the predefined privacy zones; and a view port for displaying the masked video frames.

Another embodiment of the present invention includes the steps of imaging a security zone and generating video frames of the security zone; determining coordinates of the imaged security zone; embedding the coordinates of the imaged security zone in the video frames; retrieving privacy zone coordinates prestored in a privacy zone information database; identifying privacy zones within the imaged security zone based on the retrieved privacy zone coordinates; generating one or more masks corresponding to the privacy zones within the imaged security zone; and overlaying the generated masks onto the identified privacy zones at a operator-side viewing station during viewing of the video frames.

BRIEF DESCRIPTION OF THE DRAWINGS

These and other features, aspects, and advantages of the present invention will become better understood with regard to the following description, appended claims, and accompanying drawings wherein:

DETAILED DESCRIPTION OF DISCLOSURE

Figure 1:
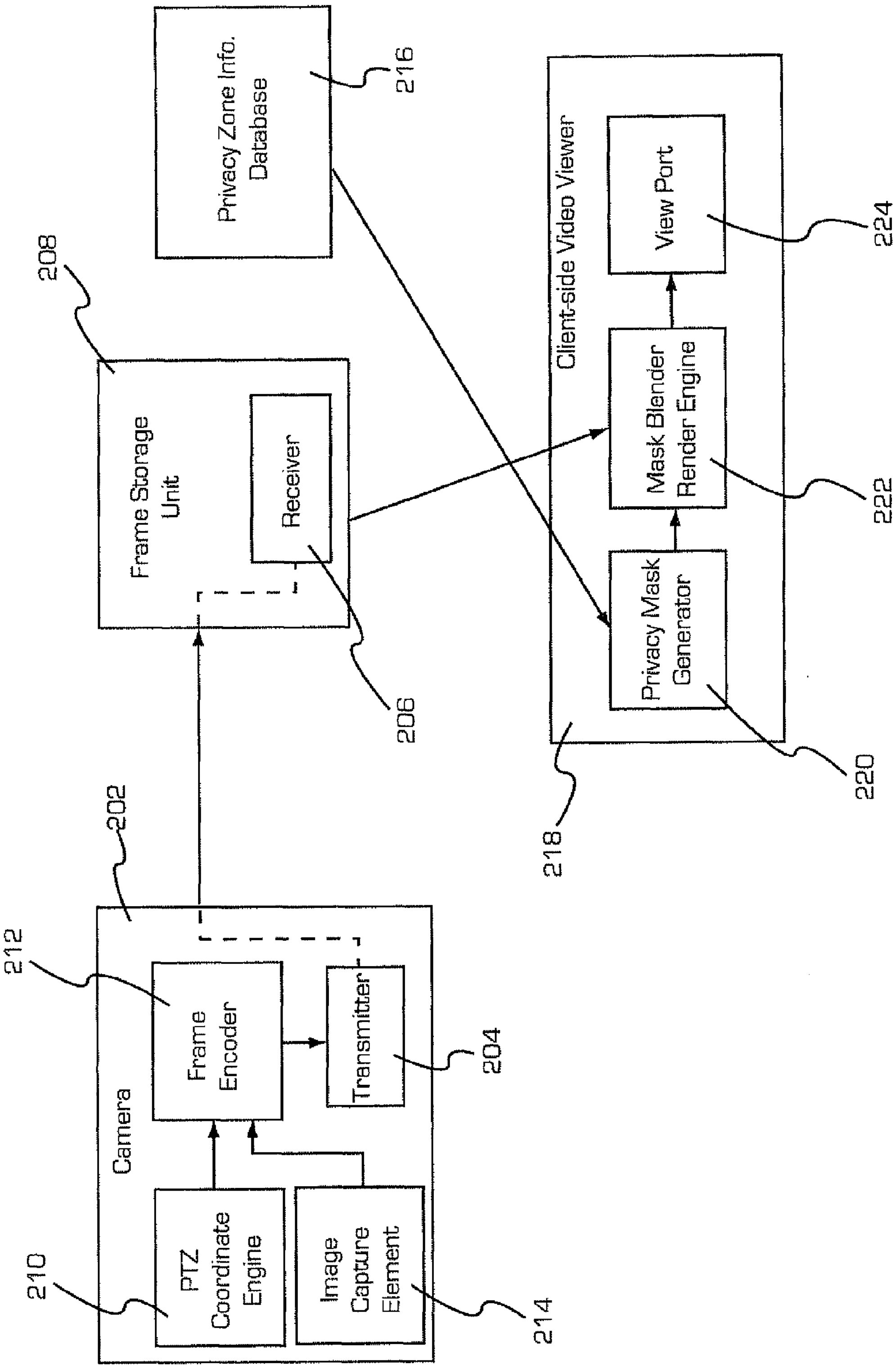
FIG. 1 illustrates a block representation of an embodiment of a security system having operator-side privacy zones in accordance with the present invention.

The present invention addresses the deficiencies in conventional video security systems by performing privacy zone masking on the client side rather than in the camera. In the present disclosure the term "client side" refers the operator side of the security system, such as security terminals. As shown in FIG. 1, an embodiment of the present invention includes a camera 202 with a transmitter 204 for transmitting images captured by the camera 202 to a receiver 206 in electrical communication with a video storage unit 208. The camera in the present invention can be either a Pan-Tilt-Zoom (PTZ) camera or a fixed camera.

The camera 202 further includes a coordinate engine 210 and a frame encoder 212. The coordinate engine 210 calculates the coordinates of the camera 202 field of view either in an absolute or relative coordinate space.

In an absolute coordinate space, the coordinate engine 210 can includes a GPS unit to provide positioning information, while motion encoders provide information regarding the orientation and zoom of the lens of the camera 202.

While in a relative coordinate space embodiment, the coordinates are determined irrespective of the exact positioning of the camera 202. Rather, the coordinates are computed based on only the orientation and zoom of the lens of the camera 202. Using the relative coordinate space however requires that the video also include a camera identifier.

A frame encoder 212 receives video frames from an image capture element 214 and embeds coordinates into each video frame. The video frames with the embedded coordinates are stored in a frame storage unit 208 until requested by an operator at a operator-side video viewer 218. The frame storage unit 208 may be a magnetic storage media, optical media, solid-state storage devices, etc. Ideally, the frame storage unit 208 is incorporated into a server located at a central monitoring station. Additionally, a privacy zone information database 216, ideally, is also provided in a centrally accessible server. However in alternative embodiments the frame storage unit 208 and/or privacy zone information database 216 may be positioned at the operator side, either incorporated into the video viewer 218 or as separate units.

The privacy zone information database 216 stores position information of preset privacy zones. The position information can include GPS data as well as other information useable for determining location and size of the privacy zone. Additionally, the privacy zones may be defined with respect to individual cameras, thus including in the position information a unique camera identifier; or the privacy zones can be defined universally using absolute coordinates, allowing a privacy zone to be masked without consideration of the camera that is generating the video.

With universally defined privacy zones, the privacy zone information database 216 need only contain a single entry for each privacy zone. On the other hand, if the privacy zones are defined with respect to individual cameras, the privacy zone information database 216 may need to contain multiple entries for each privacy zone, one entry for each camera that can image the privacy zone area.

Moreover, the privacy zone information database 216 contains viewing permission information. The viewing permission information identifies viewing level of individuals or groups of security personnel. For example, a security guard may be prohibited from viewing one privacy zone while allowed to view other privacy zones based on the security clearance of the security guard. On the other hand, a security supervisor may be provided with permission to view all privacy zones unmasked. Implementation of the selective masking requires that operator-side video viewers accept authentication credentials, such as username/password, biometrics, etc.

The viewing permission verification can be performed by a separate authentication device coupled to the operator-side video viewer or may be integrated into the operator-side video viewer. For example, a fingerprint biometric scanner can be coupled to the operator-side video viewer if the viewing permission information is fingerprint-based. Alternatively, a username/password-based viewing permission information can be implementing using the processor and input devices already provided by the operator-side video viewer.

At the operator-side video viewer 218 a privacy mask generator 220 retrieves privacy zone information from the privacy zone information database 216 when a video frame is requested for viewing. A mask blender render engine 222 combines the requested video frame with masks generated by the privacy mask generator 220. A view port 224 displays the masked video frame.

Figure 2:
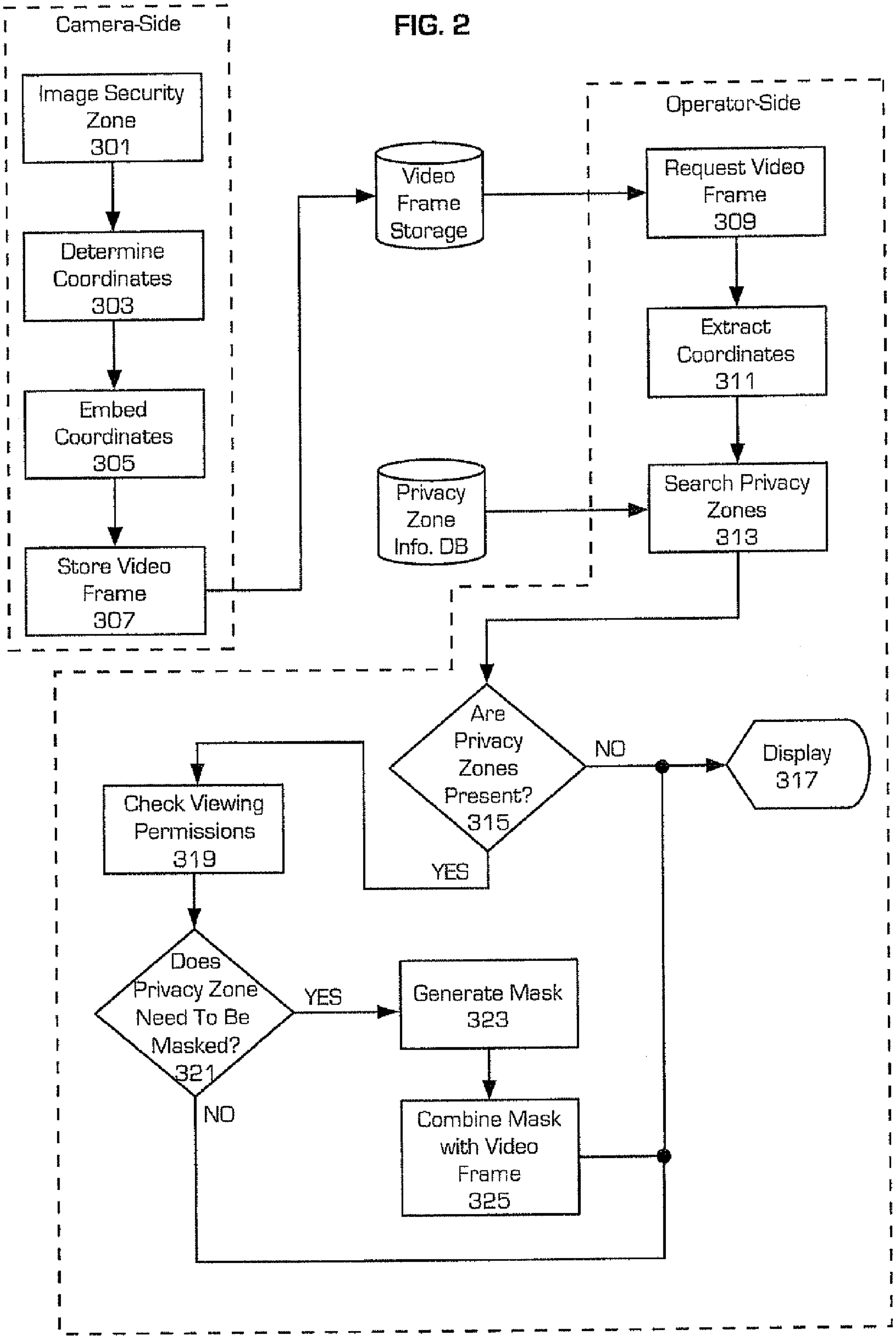
FIG. 2 illustrates a flow diagram of a set of steps for implementing operator-side privacy zones in accordance with the present invention.

Referring to FIG. 2, a flow diagram showing the steps performed in an embodiment of the present invention begins with a surveillance camera imaging a security zone, i.e. an area designated for video monitoring, in step 301. Coordinates are determined for the area imaged in step 303. The coordinates can include GPS data, as well as pan, tilt and zoom information related to the individual image. The coordinate information is embedded in each video frame in step 305. Each video frame with the embedded coordinate information is transmitted to a video frame storage unit in step 307. Steps 301-307 are performed in a video surveillance camera.

In step 309, a request is made by a security operator for a video frame stored in the video frame storage unit. Once the requested video frame is received, the coordinates are extracted from the requested video frame in step 311. Using the extracted coordinates, the present embodiment searches a privacy zone information database in step 313 for privacy zones that are located within the requested video frame.

In step 315, if it is determined that no privacy zones in the requested video frame, the process is routed to step 317 where the requested video frame is displayed without any masked regions. On the other hand, if in step 315, it is determined that privacy zones are located in the received video frame, the process continues on to step 319, where viewing permissions of the operator are checked against a rights database.

If the permissions of the operator allow for un-obscured viewing of imaged privacy zones in step 321, the process continues onto step 317 where the un-obscured (i.e. not masked) video frame is displayed. However, if in step 321 it is determined that the operator does not have permission to view the privacy zones un-obscured, the process proceeds to step 323. In step 323 a mask is generated for each privacy zone located in the requested video frame. The generated masks are combined with the requested video frame, step 321, so that the generated masks over lay the respective privacy zones in the requested video frame. Once the requested video frame has been masked in step 321, the process of the present invention displays the masked video frame in step 317. An operator-side video viewer performs steps 309-325.

Using the present invention, the video frames are stored in the video frame storage unit in an unmasked state and the masking occurs on demand when a video frame is requested for viewing. In this way, when necessary, and with the proper authorization, the full un-obscured video frames can be viewed, while during normal operation, privacy zones are masked. Moreover, one operator may view an un-obscured video frame, while at the same instance another operator at a different video viewer views the same video frame with masks applied.

The present invention can be provided as one or more software programs embodied on a computer readable medium, such as a CD-ROM disc, DVD disc, flash memory card, magnetic media, etc. The software programs include software configured to be executed by the operator-side terminal and software, or firmware, executable by the video surveillance camera of the present invention. Additional software can be included on the computer readable medium for creating and maintaining the privacy zone information database.

As well as the one or more software of the present invention, the computer readable medium of the present invention can contain one or more installer programs for properly installing the software contained therein on operator-side terminals, servers, and video surveillance camera as required for the proper operation of the operator-side privacy zone masking system described above.

Moreover the software necessary for performing the processes for operator-side privacy zone masking can be embedded as firmware in computer readable media such as EPROMs or ROMs.

The described embodiments of the present invention are intended to be illustrative rather than restrictive, and are not intended to represent every embodiment of the present invention. Various modifications and variations can be made without departing from the spirit or scope of the invention as set forth in the following claims both literally and in equivalents recognized in law.

What is claimed is:

1. A video surveillance system comprising:
- a surveillance camera in communication with said frame storage unit, said surveillance camera having:
  - a coordinate engine for determining coordinates of a current field of view of said surveillance camera; and
  - a frame encoder for embedding the determined coordinates into a respective video frame associated with said current field of view;
- a frame storage unit for receiving and storing unmasked video frames from the surveillance camera, each of the unmasked video frames having respective coordinates embedded therein;
- a privacy zone information database for storing coordinates of predefined privacy zones; and
- a video viewing unit for viewing stored video frames, said video viewing unit being in communication with said frame storage unit and said privacy zone information database, said video viewing unit including:
  - a mask generator for receiving said stored coordinates of said predefined privacy zones and generating a mask for said predefined privacy zones located within a field of view of a currently requested video frame of said stored video frames;
  - a render engine for extracting the respective coordinates from said currently requested video frame and for using the extracted coordinates to combine said generated masks with said currently requested video frame to obscure regions of said video frame corresponding to said predefined privacy zones; and
- a view port for displaying said masked video frames.

2. The video surveillance system of claim 1, further comprising a viewing permissions verifier for verifying viewing permissions of an operator requesting said video frame, wherein said mask generator generates a mask only when said operator is not permitted to view said predefined privacy zones.

3. The video surveillance system of claim 1, wherein said coordinate engine further comprising a global positioning system (GPS) receiver for determining a location of said surveillance camera.

4. The video surveillance system of claim 1, wherein said at least one surveillance camera is a PTZ camera.

5. The video surveillance system of claim 4, wherein said coordinate engine further comprising position detectors for detecting relative pan, tilt and zoom of said surveillance camera with respect to a predefined origin position of said surveillance camera.

6. A method for privacy masking, comprising:
- a camera imaging a security zone and generating video frames of said security zone;
- the camera determining coordinates of a current field of view of said imaged security zone;
- the camera embedding said coordinates of said current field of view of said imaged security zone in each respective video frame;
- the camera transmitting said video frames having said coordinates embedded therein to a storage device for storing said video frames having said coordinates embedded therein;
- an operator-side viewing device retrieving said video frames for viewing by an operator;
- the operator-side viewing device retrieving privacy zone coordinates pre-stored in a privacy zone information database;
- the operator-side viewing device extracting said coordinates embedded in said video frames;
- the operator-side viewing device using said extracted coordinates and said retrieved privacy zone coordinates to identify privacy zones within said imaged security zone;
- the operator-side viewing device generating one or more masks corresponding to said privacy zones within said imaged security zone; and
- the operator-side viewing device overlaying said generated masks onto said identified privacy zones during viewing of said video frames.

7. The method as in claim 6, further comprising storing said video frames for later viewing in a video frame storing unit.

8. The method as in claim 6, wherein said coordinates of said imaged security zone are determined from GPS data.

9. The method as in claim 6, wherein said coordinates of said imaged security zone are determined by position detectors situated on said camera, said position detectors detecting relative pan, tilt and zoom of said camera with respect to a predefined origin position.

10. The method as in claim 6, further comprising verifying viewing permissions of an operator requesting said video frames, wherein said one or more masks are generated only if said operator does not have permission to view said identified privacy zone.

11. A non-transitory computer readable medium embodying instructions for controlling one or more processors to perform a method of operator-side privacy masking of surveillance video, said method comprising:
- controlling a video surveillance camera to image a security zone;
- the surveillance camera generating video frames of said security zone;
- the surveillance camera determining coordinates of a current field of view of said imaged security zone;
- the surveillance camera embedding said coordinates of said current field of view of said imaged security zone in each respective video frame;
- an operator-side viewing unit retrieving privacy zone coordinates prestored in a privacy zone information database;
- the operator-side viewing device extracting said coordinates embedded in said video frames;
- the operator-side viewing unit using said extracted coordinates and said retrieved privacy zone coordinates to identify identifying privacy zones within said imaged security zone;

the operator-side viewing unit generating one or more masks corresponding to said privacy zones within said imaged security zone; and the operator-side viewing unit overlaying said generated masks onto said identified privacy zones during viewing of said video frames.

12. The method as in claim 11, further comprising verifying viewing permissions of an operator requesting said video frames, wherein said one or more masks are generated only if said operator does not have permission to view said identified privacy zone.

* * * * *